US 12,066,101 B2

(12) United States Patent
Reisch et al.

(10) Patent No.: US 12,066,101 B2
(45) Date of Patent: Aug. 20, 2024

(54) ACTUATOR DEVICE FOR GENERATING A LONGITUDINAL POSITIONING MOVEMENT

(71) Applicant: ZF Friedrichshafen AG, Friedrichshafen (DE)

(72) Inventors: Matthias Reisch, Ravensburg (DE); Jürgen Wafzig, Bermatingen (DE); Peter Sigg, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/785,551

(22) PCT Filed: Nov. 20, 2020

(86) PCT No.: PCT/EP2020/082803
§ 371 (c)(1),
(2) Date: Jun. 15, 2022

(87) PCT Pub. No.: WO2021/121855
PCT Pub. Date: Jun. 24, 2021

(65) Prior Publication Data
US 2023/0008294 A1  Jan. 12, 2023

(30) Foreign Application Priority Data
Dec. 17, 2019  (DE) ..................... 10 2019 219 813.9

(51) Int. Cl.
*F16H 25/22* (2006.01)
*F16H 61/00* (2006.01)
(Continued)

(52) U.S. Cl.
CPC ....... *F16H 63/304* (2013.01); *F16H 25/2214* (2013.01); *F16H 61/0006* (2013.01);
(Continued)

(58) Field of Classification Search
CPC ..... F16H 2025/2034; F16H 2025/2031; F16H 2025/2062; F16H 2025/2075; F16H 2025/2078; F16H 25/2021; F16H 61/0006
See application file for complete search history.

(56) References Cited

U.S. PATENT DOCUMENTS 6,453,761 B1 * 9/2002 Babinski .................. H02K 7/06
 310/80
6,570,282 B1 5/2003 Ito et al.
(Continued)

FOREIGN PATENT DOCUMENTS

CN 103444061 A 12/2013
CN 107124062 A 9/2017
(Continued)

OTHER PUBLICATIONS

International Search Report (English Translation) PCT/EP2020/082803, dated Feb. 16, 2021. (2 pages).
(Continued)

*Primary Examiner* — Gregory Robert Weber
(74) *Attorney, Agent, or Firm* — Dority & Manning, P.A.

(57) ABSTRACT

An actuator device (1) for generating a longitudinal positioning movement to engage a shift element includes an actuator housing (2) and an electric motor (3). The electric motor (3) has a stator (4) and a rotor (5), the stator (4) being stationarily fixed at the housing (2), and the rotor (5) being rotatable relative to the stator (4) and rotationally fixed to a rotor carrier (6) supported relative to the housing (2) via a fixed bearing (7). The actuator device (1) further includes a threaded drive (8) having a nut (9) and a threaded spindle (10), with the nut (9) being rotationally driveable and axially fixed, and the threaded spindle (10) being axially displaceable along the threaded nut (9) and secured against rotation. The threaded nut (9) is rotationally fixed to the rotor carrier
(Continued)

(6) and is at least partially radially within the fixed bearing (7).

17 Claims, 3 Drawing Sheets

(51) Int. Cl.
    *F16H 63/30*       (2006.01)
    *H02K 1/278*     (2022.01)
    *F16H 25/20*       (2006.01)

(52) U.S. Cl.
    CPC ......... *H02K 1/278* (2013.01); *F16H 25/2015* (2013.01); *F16H 2025/2031* (2013.01); *F16H 2025/2075* (2013.01); *F16H 2063/3063* (2013.01)

(56) References Cited

U.S. PATENT DOCUMENTS

| | | |
|---|---|---|
| 8,245,589 B2 | 8/2012 | Mohr et al. |
| 10,024,405 B2 * | 7/2018 | Emmons ............... F16H 25/205 |
| 10,461,606 B2 * | 10/2019 | Ognibene ............ B62D 5/0403 |
| 10,830,320 B2 * | 11/2020 | Matsuto ............ F16H 25/2228 |
| 11,067,140 B2 * | 7/2021 | Dietrich .................. H02K 7/06 |
| 2015/0171702 A1 * | 6/2015 | Matsuda ............ F16H 63/3416 |
| | | 310/78 |
| 2018/0041094 A1 | 2/2018 | Ognibene |
| 2019/0040940 A1 | 2/2019 | Matsuto et al. |
| 2020/0158231 A1 | 5/2020 | Reisch et al. |
| 2020/0164457 A1 * | 5/2020 | Rosengren ............... H02K 7/00 |

FOREIGN PATENT DOCUMENTS

| | | |
|---|---|---|
| CN | 108781021 A | 11/2018 |
| DE | 102006049274 A1 | 4/2008 |
| DE | 102012221992 A1 | 6/2014 |
| DE | 102017211578 A1 | 1/2019 |
| EP | 1182765 A1 | 2/2002 |
| EP | 3279061 A1 | 2/2018 |

OTHER PUBLICATIONS

German Search Report De 10 2019 219 813.9, dated Jul. 21, 2020. (12 pages).
Translation—Chinese Office Action, Dec. 7, 2023.

* cited by examiner

ACTUATOR DEVICE FOR GENERATING A LONGITUDINAL POSITIONING MOVEMENT

CROSS-REFERENCE TO RELATED APPLICATION

The present application is related and has right of priority to German Patent Application No. 10 2019 219 813.9 filed on Dec. 17, 2019 and is a nationalization of PCT/EP2020/082803 filed in the European Patent Office on Nov. 20, 2020, both of which are incorporated by reference in their entirety for all purposes.

FIELD OF THE INVENTION

The present invention relates generally to an actuator device for generating a longitudinal actuating motion or "longitudinal positioning movement" in order to engage a shift element. The actuator device includes an electric motor arranged within an actuator housing. The electric motor has a stator, which is at least indirectly stationarily fixed at the actuator housing, and a rotor, which is rotatable relative to the stator. The actuator device also includes a threaded drive having a nut, which is rotationally driveable and axially fixed, and a threaded spindle, which is axially displaceable along the threaded nut and is rotationally fixed.

BACKGROUND

DE 10 2006 049 274 A1 describes a device for actuating a component rotatably mounted on a shaft, in particular a gearwheel of a transmission device, particularly an idler gear. The component is transferrable into an engaged condition via at least one engagement device having an electric actuator, for the purpose of which the component is rotationally fixed to the shaft. The component is acted upon, out of the interior of the shaft, by the actuation force necessary for engagement or disengagement. The at least one electric actuator is arranged at least partially in the interior of the shaft.

SUMMARY OF THE INVENTION

An actuator device for generating a longitudinal actuating motion or "longitudinal positioning movement" is described herein that is, in particular, compact, and achieves a high power density.

An actuator device according to the invention for generating a longitudinal actuating motion in order to engage a shift element includes an electric motor arranged within an actuator housing. The electric motor has a stator, which is at least indirectly stationarily fixed at the actuator housing, and a rotor, which is rotatable relative to the stator. The rotor is rotationally fixed to a rotor carrier, which is at least indirectly supported with respect to the actuator housing via a fixed bearing. The actuator device also includes a threaded drive having a nut, which is rotationally driveable and axially fixed, and a threaded spindle, which is axially displaceable along the threaded nut and is secured against rotation. The threaded nut is rotationally fixed to the rotor carrier and arranged, at least partially, radially within the fixed bearing. The fixed bearing supports axial loads from the threaded drive on the actuator housing.

The threaded drive, which is also referred to as a spindle drive, is integrated in the electric motor of the actuator device. The rotor carrier, which is rotationally fixed to the rotor, rotates relative to the stator together with the threaded nut, which is rotationally fixed to the rotor carrier. The threaded nut is connected to the rotor carrier, for example, as one piece or at least indirectly rotationally fixed to the rotor carrier, in particular by suitable securing elements. Due to the rotation of the rotor carrier together with the threaded nut, the threaded spindle is set into axial motion, without rotating relative to the actuator housing. The axial loads that act upon the threaded drive and, particularly, upon the threaded spindle, are guided directly from the threaded spindle via the threaded nut into the fixed bearing, which is axially supported on the actuator housing. The axial loads result from actuating forces that act upon the actuating element, which is actuatable by the actuator device.

The fixed bearing is supported axially as well as radially with respect to the actuator housing. In other words, radial and, in particular, axial loads from the threaded drive are absorbed via the fixed bearing and introduced into the actuator housing. The concept "at least in sections or "at least partially," radially within the fixed bearing" is understood to mean that the threaded nut is arranged within a bearing inner race of the fixed bearing at least via a portion of its axial length. As a result, the actuator device is compact, in particular, in the axial direction and, thus, saves axial installation space, wherein the axial loads are transferred directly from the threaded nut via the fixed bearing into the actuator housing.

The threaded spindle, which is axially displaceable relative to the threaded nut, preferably ends within the actuator device. In other words, the threaded spindle protrudes with one end out of the actuator device, wherein the protruding end is operatively connected to a spring casing in order to actuate the shift element. The other end of the threaded spindle always remains radially within the actuator device.

Preferably, the threaded drive is a ball screw having a plurality of balls guided in appropriate races defined spatially between the threaded spindle and the threaded nut. In other words, both the threaded spindle and the threaded nut include at least one helically wound race, wherein balls of the ball screw are guided in one or multiple thread(s) between the race of the threaded nut and the race of the threaded spindle.

Preferably, the ball screw includes a ball return. Consequently, the ball screw includes a ball return channel, by which a ball circuit of the ball screw is implemented. In other words, the balls are continuously guided regardless of a direction of rotation of the threaded nut. Due to the fact that the threaded nut is arranged, at least in sections, radially within the fixed bearing, it is achieved that a ball return channel of the ball screw is also arranged, at least in sections, radially within the fixed bearing. Due to the arrangement of the threaded nut relative to the fixed bearing, the ball return channel is secured against falling out of the threaded drive. In other words, the ball circuit is also arranged, at least partially, radially within the fixed bearing.

Alternatively, the threaded drive is a sliding drive. In this case, the threaded spindle of the sliding drive has a body that is slender in comparison to the ball screw.

Simultaneously, the threaded spindle has a comparatively long length, wherein multiple threads of the threaded spindle and of the threaded nut are mutually engaged, and so a contact pressure per thread is reduced.

Preferably, the rotor carrier is at least indirectly supported with respect to the actuator housing via a floating bearing. Thus, in addition to the fixed bearing, a second bearing element, namely the floating bearing, is integrated in the actuator device. Depending on requirements on the actuator device, the floating bearing is, for example, a plain bearing or an antifriction bearing.

According to one exemplary embodiment, the rotor includes at least one magnetic element, which is arranged at the rotor carrier in a positionally fixed manner. Upon actuation of the electric motor, the rotor formed from the at least one pre-magnetized element is set into rotation relative to the stator, wherein the rotor rotates together with the rotor carrier and the threaded nut, and so the threaded spindle is set into a longitudinal motion relative to the threaded nut and the actuator housing. For this purpose, the rotor is attached at the rotor carrier such that a relative movement is prevented. In particular, the rotor is connected to the rotor carrier in an integrally bonded manner via adhesive bonding. A force-fit and/or form-locking connection between the rotor and the rotor carrier is also conceivable.

Preferably, the at least one magnetic element is in the shape of a ring, a sleeve, and/or a rod. Due to the fact that the at least one magnetic element is a laminated core, a guidance of the magnetic field lines is assisted. Depending on the necessary performance of the electric motor, the rotor is instead formed from two or more magnetic elements. Laminated cores are formed from a plurality of disk-like metal sheets, which are arranged stacked in the axial direction and secured at the rotor carrier. Moreover, the rotor is formable from multiple ring-shaped or sleeve-shaped magnetic elements, which are also arranged stacked in the axial direction and secured, in particular adhesively bonded, at the rotor carrier. Rod-shaped magnetic elements extend essentially in the axial direction, i.e., in parallel to the axis of rotation of the rotor, wherein the rod-shaped elements are arranged adjacent to one another continuously at the outer circumference of the rotor carrier. Particularly, by rod-shaped magnetic elements, which jointly form the rotor, stronger electric motors are implemented in comparison to electric motors having sleeve-shaped rotors.

Preferably, the fixed bearing is arranged at the actuator housing in an axially fixed manner by a securing element. The securing element is a ring or as a disk, which is arranged in a groove of the rotor carrier or of the axial housing and axially fixes the fixed bearing. Alternatively, it is conceivable that the fixed bearing is arranged in an axially fixed manner with respect to the actuator housing by shaping the components accommodating the fixed bearing, for example, via plastic working of the actuator housing and/or of the threaded nut and/or of the rotor carrier.

Preferably, the securing element is arranged radially within a winding overhang of the electric motor. The electric motor is actuated in a known way via energization of the winding overhang, and so the rotor rotates with respect to the stator. Due to the arrangement of the securing element radially within the winding overhang, in particular, the installation length of the actuator device is reduced, and so this measure advantageously affects the compactness of the actuator device.

Moreover, the threaded spindle is preferably operatively connected to an axial spring, which is arranged in a spring holder of a spring casing, which is rotationally fixed with respect to the actuator housing. The preloaded axial spring is utilized for preloading the spring casing into an axial actuating motion in order to actuate a shift element, in particular a shifting dog, by the spring casing. In other words, the spring casing is operatively connected to the shifting dog. The axial spring is, for example, a set of cup springs and preferably acts symmetrically, i.e., it is deformed in the same direction upon application of a tensile or compressive load.

Moreover, it is preferred that the spring holder is rotationally fixed to the threaded spindle, wherein the spring holder is secured against rotation relative to the spring casing. The spring holder is connected, for example, integrally, to the threaded spindle. Moreover, the spring holder includes, at its outer circumferential surface, at least one radial projection, which at least partially engages into an axial groove of the spring casing complementary thereto and is guided in the axial direction along the spring casing in order to enable an axial motion of the spring holder relative to the spring casing corresponding to the spring travel of the axial spring and in order to implement a preloading of the spring casing. The rotation lock of the threaded spindle is preferably implemented by the spring casing, which is rotationally fixed with respect to the actuator housing.

Preferably, an interior space of the actuator housing is fluid-sealed with respect to an external atmosphere. Moreover, the fixed bearing and/or the threaded drive are/is preferably exempted from this fluid seal. Due to the pressure differences arising in the interior of the actuator during the axial travel of the threaded spindle, a lubricant, in particular a lube oil, is drawn in from outside the actuator device to the fixed bearing and/or to the threaded nut. In other words, an under-pressure condition arises in the actuator device, which delivers the lubricant to the elements of the actuator device to be lubricated. Moreover, so-called "cover disks," which protect the elements to be lubricated against coarse contaminants, are provided at the fixed bearing and/or at the threaded nut.

Preferably, a circuit board is provided for at least indirect interconnection of the electric motor. The circuit board is provided for the interconnection of winding wires of the electric motor and/or of the at least one winding overhang of the electric motor. Preferably, the circuit board is arranged on the non-output side, i.e., on a side of the actuator device opposite the spring casing.

According to one exemplary embodiment, at least one sensor is arranged at the circuit board for detecting a rotational position of the electric motor. For example, at least one Hall sensor is arranged at the circuit board in order to effectuate the commutation of the electric motor and to sense its angular position. Other types of sensors that are capable of determining a rotational and/or angular position of the rotor relative to the stator are also conceivable.

Preferably, the circuit board defines a central opening, through which a bearing journal is guided in order to accommodate the floating bearing in order to support the rotor carrier with respect to the actuator housing. The bearing journal is at least indirectly rotationally fixed to the actuator housing, wherein the floating bearing runs on the bearing journal and, thus, rotatably supports the rotor carrier with respect to the bearing journal and the actuator housing.

BRIEF DESCRIPTION OF THE DRAWINGS

Three preferred exemplary embodiments of the invention are explained in greater detail in the following with reference to the figures, wherein identical or similar elements are provided with the same reference characters, wherein.

DETAILED DESCRIPTION

Figure 1:
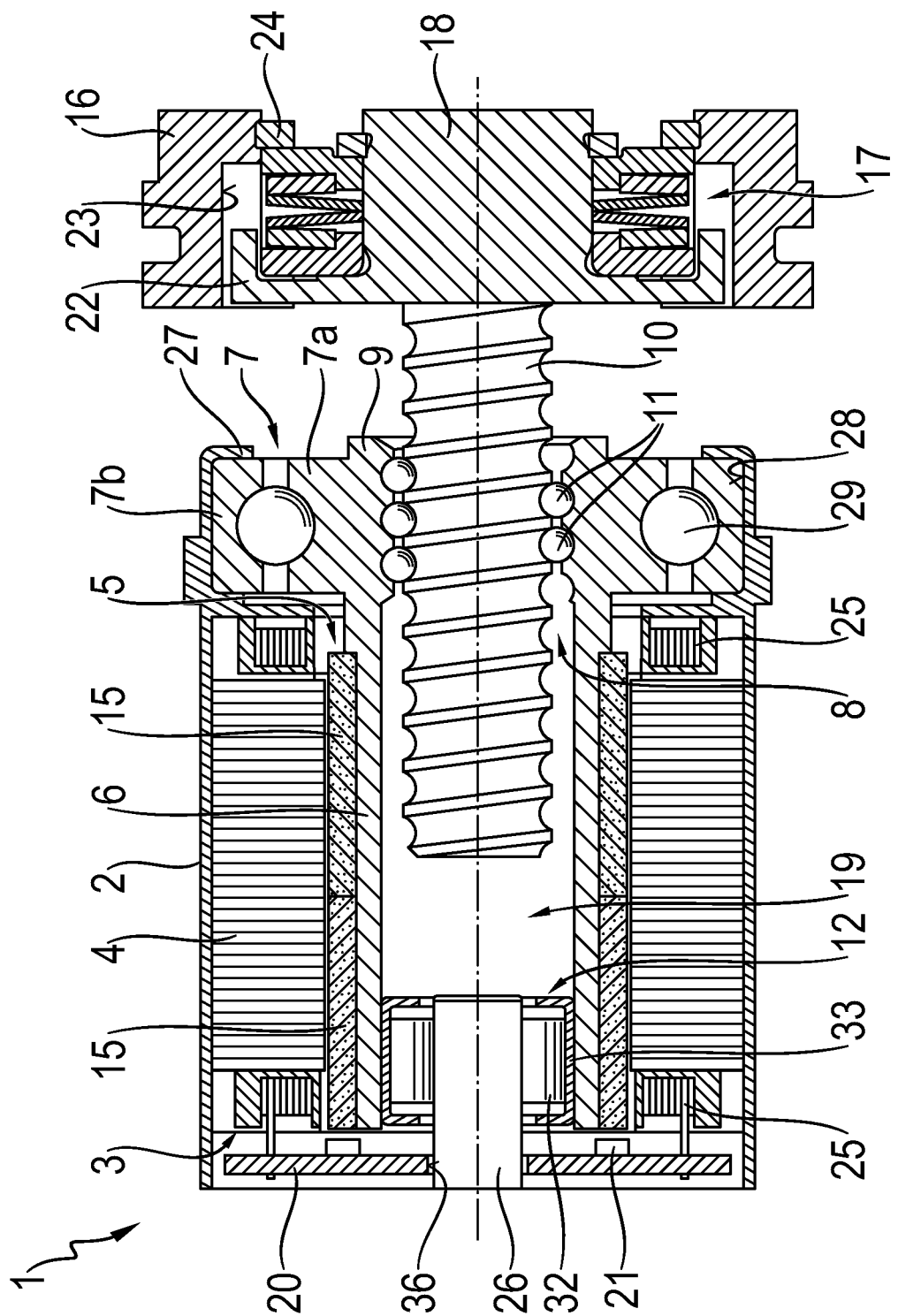
FIG. 1 shows a schematic longitudinal sectional representation of an actuator device according to the invention, according to a first embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
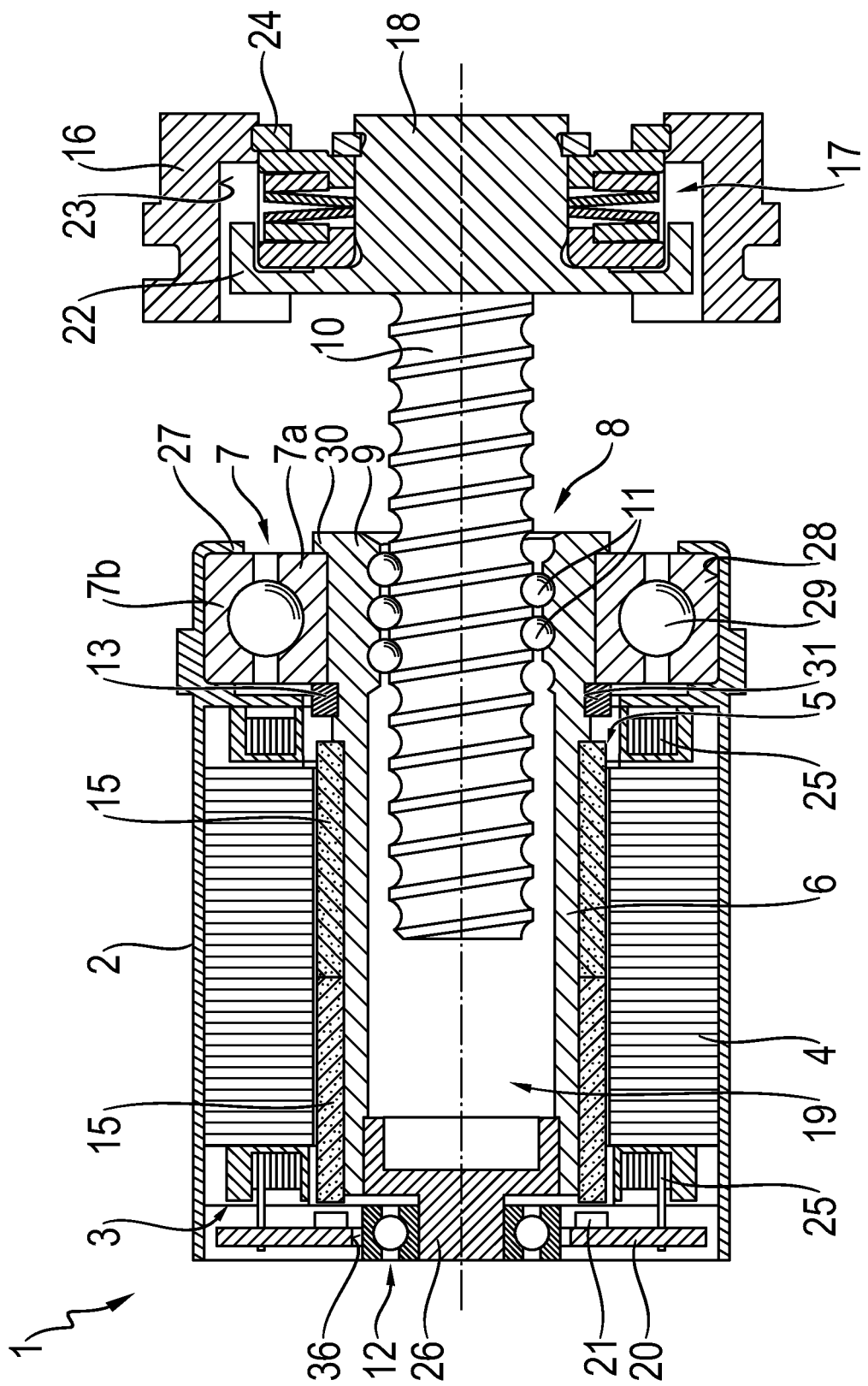
FIG. 2 shows a schematic longitudinal sectional representation of an actuator device according to the invention, according to a second embodiment.
Figure 3:
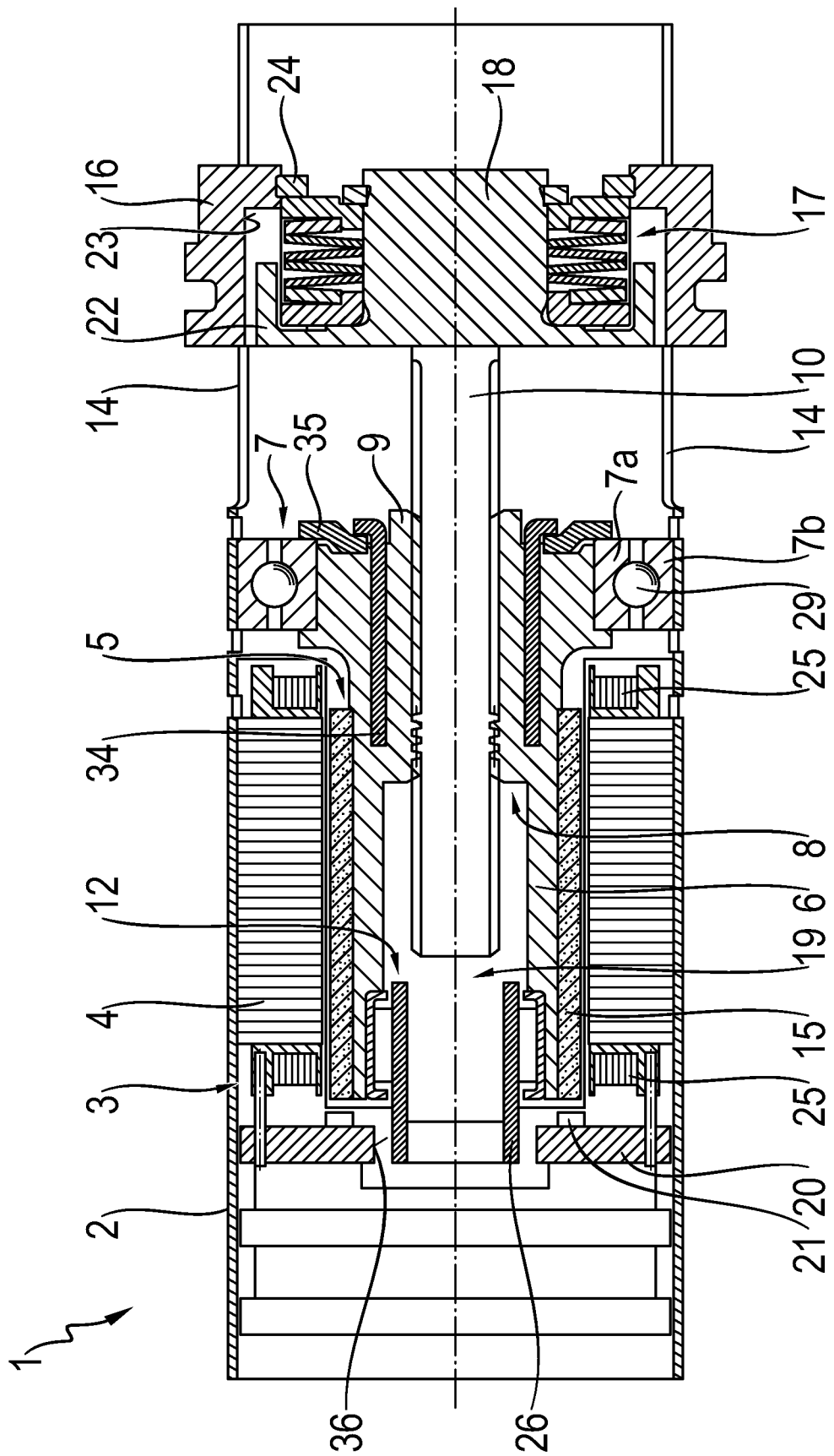
FIG. 3 shows a schematic longitudinal sectional representation of an actuator device according to the invention, according to a third embodiment.

According to FIGS. 1-3, an actuator device 1 for generating a longitudinal actuating motion in order to engage a shift element (not shown here) includes an electric motor 3 arranged within an actuator housing 2. The electric motor 3 includes a stator 4, which is stationarily fixed at the actuator housing 2. The electric motor 3 further includes a rotor 5, which is rotationally fixed to a rotor carrier 6, and is arranged so as to be rotatable relative to the stator 4. In the present exemplary embodiments, the rotor 5 is adhesively bonded at the outer circumference of the rotor carrier 6, i.e., connected to a rotor carrier 6 in an integrally joined manner.

The rotor 5 includes at least one magnetic element 15, which, in particular, is pre-magnetized and is arranged at the rotor carrier 6 in a positionally fixed manner. The magnetic element(s) 15 is, for example, in the shape of a ring or a rod and, depending on the requirement, acts in an operative connection with a laminated core. In the present exemplary embodiments, the magnetic element 15 is in the shape of a sleeve, wherein, in FIGS. 1 and 2, two sleeve-shaped magnetic elements 15 are provided for forming the rotor 5. In FIG. 3, the rotor 5 is made of a single sleeve-shaped magnetic element 15.

The actuator device 1 also includes a threaded drive 8 having a nut 9, which is rotationally drivable and axially fixed, and a threaded spindle 10, which is axially displaceable along the threaded nut 9 and is secured against rotation. The threaded nut 9 is rotationally fixed to the rotor carrier 6.

The threaded nut 9 is arranged essentially radially within a fixed bearing 7, which is provided for axially and radially supporting the rotor carrier 6 via the threaded nut 9 and the fixed bearing 7 on the actuator housing 2. In other words, axial loads from the threaded drive 8 are directed via the fixed bearing 7 onto the actuator housing 2. Moreover, the rotor carrier 6 is supported via a floating bearing 12 with respect to the actuator housing 2, wherein, for this purpose, the floating bearing 12 runs on a housing-affixed bearing journal 26. The fixed bearing 7 is formed from a bearing inner race 7a and a bearing outer race 7b, wherein the bearing inner race 7a is rotationally fixed to the rotor carrier 6, and wherein the bearing outer race 7b is fixedly arranged at the actuator housing 2. A plurality of rolling elements 29 is arranged between the bearing inner race 7a and the bearing outer race 7b. The fixed bearing 7 is a ball bearing in the present case, which transmits radial loads as well as axial loads.

An interior space 19 of the actuator housing 2 is fluid-sealed with respect to an external atmosphere. A lubrication of the threaded nut and/or of the fixed bearing 7 and/or of the floating bearing 12 takes place by generating a pressure difference from an axial displacement of the threaded spindle 10 relative to the actuator housing 2.

The threaded spindle 10 is connected integrally, i.e., in a rotationally fixed manner, to a spring holder 18, wherein the spring holder 18 accommodates an axial spring 17, which is a set of cup springs, which deforms symmetrically, i.e., in the same direction, regardless of a tensile or compressive loading of the axial spring 17. Consequently, the threaded spindle 10 is operatively connected to the axial spring 17, which is arranged in the spring holder 18 of a spring casing 16, with the spring casing 16 being rotationally fixed with respect to the actuator housing 2. The axial spring 17 is supported in the present case, on the one hand, axially on the spring holder 18 and, on the other hand, axially on a securing ring 24 of the spring casing 16. The spring holder 18, which is rotationally fixed to the threaded spindle 10, is secured against rotation relative to the spring casing 16, wherein, for this purpose, radial projections 22 are integrally formed at the spring holder 18, which are axially guided in grooves 23 of the spring casing 16. The spring casing 16 (which is not described and shown in greater detail here) actuates a shifting dog or dog clutch shifting element.

Upon actuation of the actuator device 1, rotation of the rotor carrier 6 causes an axial displacement of the threaded spindle 10 takes place due to the, which results in an axial deformation of the axial spring 17 depending on a possible counter force. Depending on the counter force of the shifting dog, the spring casing 16 is preloaded by the axial spring 17. This is the case, for example, in a tooth-on-tooth position of the dog. After resolution of the tooth-on-tooth position, i.e., as soon as a tooth of the shifting dog reaches a tooth gap between two teeth, the axial spring 17 relaxes and the dog engages into the tooth gap.

A circuit board 20 is arranged at the actuator housing 2 on a side of the actuator device 1 opposite the spring casing 16. The circuit board 20 is configured for interconnecting the electric motor 3, in particular winding overhangs 25 of the electric motor 3. Three sensors 21, particularly Hall sensors, are arranged on a side of the circuit board 20 facing the rotor 5, which detect a rotational position of the electric motor 3, i.e., an angular position of the rotor 5 relative to the stator 4, wherein the rotor 5 or the magnetic element(s) 15 of the rotor 5 is/are utilized as a signal transmitter or signal transmitters for the sensors 21. The Hall sensors also effectuate the commutation of the electric motor 3.

The housing-affixed bearing journal 26 is coaxially guided through a central opening 36 defined in the circuit board 20 and provided for accommodating the floating bearing 12. So, the rotor carrier 6 is supported with respect to the actuator housing 2 not only via the fixed bearing 7, but also via the floating bearing 12.

FIG. 1 shows a first exemplary embodiment of the actuator device 1 according to the invention. The threaded drive 8 is a ball screw, wherein a plurality of balls 11 is guided spatially between the threaded spindle 10 and the threaded nut 9. Moreover, a ball return (not shown here) is arranged radially within the threaded nut 9, wherein, due to such an arrangement of the ball return, the ball return is prevented from falling out by the threaded nut 9. The bearing inner race 7a of the fixed bearing 7, furthermore, is integrated at the rotor carrier 6, i.e., is integrally connected thereto.

The threaded spindle 10 makes a pure axial motion, without carrying out a turning motion with respect to the actuator housing 2, during a turning motion of the threaded nut 9. Starting from the spring holder 18, the axial load is directed via the preloaded axial spring 17 to the spring casing 16 and, thus, to the actuator output. Regardless of the direction of motion of the threaded spindle 10, i.e., regardless of whether the actuator force acts toward the left or toward the right, the axial spring 17 is loaded in the same direction. While not shown in detail, the spring casing 16 is arranged in a rotationally fixed manner with respect to a housing.

In the present exemplary embodiment, the bearing outer race 7b of the fixed bearing 7 is accommodated in a circumferential indentation 28 at the actuator housing 2. During the installation of the fixed bearing 7, the bearing outer race 7b comes to rest, with a first end face of the circumferential indentation 28, axially at the actuator housing 2, wherein a section of the actuator housing 2 formed in the area of the second end face is plastically deformed via shaping to form a radially extending housing section 27, and so the fixed bearing 7 is arranged in an axially fixed manner with respect to the actuator housing 2.

The floating bearing 12 is a needle bearing in FIG. 1, wherein the needles 32 of the floating bearing 12 roll at the bearing journal 26 and at an outer race 33, which is pressed into the rotor carrier 6.

FIG. 2 shows a second exemplary embodiment of the actuator device 1 according to the invention. The threaded drive 8 is similar to as shown in FIG. 1. The actuation of the threaded spindle 10 and, associated therewith, the actuation of the spring casing 16 in order to control the shifting dog also takes place similar to as shown in FIG. 1.

In the present exemplary embodiment according to FIG. 2, the bearing outer race 7b of the fixed bearing 7 is also accommodated in a circumferential indentation 28 at the actuator housing 2. During the installation of the fixed bearing 7, the fixed bearing 7 is positioned at a desired axial position at the actuator housing 2, wherein, thereafter, a plastic deformation of the actuator housing 2 takes place on both sides of the fixed bearing 7 in order to axially fix the bearing outer race 7b relative to the actuator housing 2. The bearing inner race 7a of the fixed bearing 7 is axially fixed at the threaded nut 9, wherein the threaded nut 9 has an upward lip 30, at which the bearing inner race 7a comes to rest during the installation. On the side of the bearing inner race 7a opposite the upward lip 30, a circumferential groove 31 is formed at the threaded nut 9, into which a securing element 13 (a securing ring) engages in order to arrange the bearing inner race 7a in an axially fixed manner with respect to the rotor carrier 6 and to the threaded nut 9. In FIG. 2, in order to save additional axial installation space, the securing element 13 is formed such that it is arranged radially within a winding overhang 25 of the electric motor 3.

In contrast to the embodiment according to FIG. 1, the floating bearing 12 is a ball bearing in FIG. 2, wherein the ball bearing is supported on the actuator housing 2 and supports a bearing journal 26. The bearing journal 26 is a peg-shaped rotor end, which is rotationally fixed to the rotor carrier 6, particularly by being pressed into the rotor carrier 6. Alternatively, the bearing journal 26 in this exemplary embodiment is integrally connected to the rotor carrier 6. In contrast to the embodiment according to FIG. 1, this embodiment enables the use of a longer spindle 10 and, thus, allows for implementation of greater actuation travel of the actuator.

According to the third exemplary embodiment according to FIG. 3, the threaded drive 8 is a sliding drive, wherein the thread of the threaded spindle 10 glides off of the thread of the threaded nut 9. In comparison to the preceding exemplary embodiments, the threaded spindle 10 is more slender and longer in order to increase the efficiency. Moreover, the threaded nut 9 is also axially longer, and so multiple threads of the threaded spindle 10, which are trapezoidal threads, and of the threaded nut 9 engage into one another in order to increase a contact pressure per thread and, thus, to also reduce the wear and increase the efficiency.

In other words, in order to be able to achieve a favorable efficiency of the spindle drive, the diameter of the threaded nut 9 is small in comparison to its length. Moreover, the rotor carrier 6 is a plastic injection-molded part. This enables, on the one hand, a low friction coefficient, which positively affects the efficiency of the actuator device 1 and, on the other hand, low manufacturing costs of the actuator device 1. In order to achieve a uniform load of the threads across the entire length of the threaded nut 9, a metallic reinforcing element 34 is also injected into the rotor carrier 6. This reinforcing element 34 is provided with positive-fit elements, for example, fluting, threads, and/or holes, in order to ensure a fixed connection of plastic and metal. In addition, this reinforcing element 34 is utilized for axially fixing the fixed bearing 7 on the rotor carrier 6 via a support shim 35 by a shaping process.

The bearing journal 26 is, partially or in sections, a sleeve in FIG. 3. This makes it possible that the threaded spindle 10, upon displacement, plunges or protrudes into the bearing journal 26 and, as a result, greater actuation travel of the threaded drive 8 is made possible. The floating bearing 12 for the support and mounting of the rotor carrier 6 is similar to the floating bearing 12 according to FIG. 1.

The spring casing 16 is guided in a rotationally fixed manner in recesses 14 situated in the actuator housing 2 on opposite sides. For the rest, the spring casing 16 as well as the spring holder 18, which is effectively arranged thereon, including the axial spring 17, are similar to the preceding embodiments.

In comparison to the exemplary embodiments according to FIGS. 1 and 2, it is advantageous in the case of FIG. 3 that the actuator device 1, in particular the threaded nut 9 having a trapezoidal thread made of plastic, is comparatively easily and cost-effectively manufacturable. By comparison, in the case of an actuator device 1 having a ball screw (FIGS. 1 and 2), the high efficiency as well as a high transmissible axial load are advantageous. Of course, it is conceivable to arbitrarily combine the features of all exemplary embodiments with one another.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 actuator device
2 actuator housing
3 electric motor
4 stator
5 rotor
6 rotor carrier
7 fixed bearing 7a bearing inner race
7b bearing outer race
8 threaded drive
9 threaded nut
10 threaded spindle
11 ball
12 floating bearing
13 securing element
14 recess in the actuator housing
15 magnetic element
16 spring casing
17 axial spring
18 spring holder
19 interior space of the actuator housing
20 circuit board
21 sensor
22 radial projection
23 groove at the spring casing
24 securing ring
25 winding overhang
26 bearing journal
27 housing section
28 indentation
29 rolling element
30 upward lip
31 groove at the threaded nut
32 needle
33 outer race of the floating bearing
34 reinforcing element
35 support shim
36 opening

The invention claimed is:

1. An actuator device (1) for generating a longitudinal positioning movement to engage a shift element, the actuator device (1) comprising:
an actuator housing (2);
an electric motor (3) within the actuator housing (2), the electric motor (3) having a stator (4) and a rotor (5), the stator (4) being at least indirectly stationarily fixed at the actuator housing (2), the rotor (5) being rotatable relative to the stator (4), the rotor (5) being rotationally fixed to a rotor carrier (6) to prevent rotation of the rotor (5) relative to the rotor carrier (6), the rotor carrier (6) being at least indirectly supported relative to the actuator housing (2) via a fixed bearing (7); and
a threaded drive (8) having a threaded nut (9) and a threaded spindle (10), the threaded nut (9) being rotationally driveable and axially fixed, the threaded spindle (10) being axially displaceable along the threaded nut (9) and being secured against rotation, the threaded nut (9), the rotor carrier (6), and a bearing inner race (7a) of the fixed bearing (7) being formed as a single monolithic part, the threaded nut (9) being at least partially radially within the fixed bearing (7) with at least a portion of an axial length of the threaded nut (9) that engages with the threaded spindle (10) being directly radially within with fixed bearing (7), the fixed bearing (7) supporting axial loads from the threaded drive (8) on the actuator housing (2).

2. The actuator device (1) of claim 1, wherein the threaded drive (8) is a ball screw, the ball screw includes a plurality of balls (11) spatially between the threaded spindle (10) and the threaded nut (9).

3. The actuator device (1) of claim 2, wherein the ball screw further includes a ball return.

4. The actuator device (1) of claim 1, wherein the threaded drive (8) is a lead screw.

5. The actuator device (1) of claim 1, further comprising a floating bearing (12), the rotor carrier (6) being at least indirectly supported relative to the actuator housing (2) via the floating bearing (12).

6. The actuator device (1) of claim 1, wherein the rotor (5) includes at least one magnetic element (15), each of the at least one magnetic element (15) being fixed to the rotor carrier (6).

7. The actuator device (1) of claim 6, wherein the at least one magnetic element (15) comprises one or more of a sleeve, a ring, or a rod.

8. The actuator device (1) of claim 1, further comprising a securing element (13), the fixed bearing (7) being axially fixed to the actuator housing (2) by the securing element (13).

9. The actuator device (1) of claim 8, wherein the securing element (13) is radially within a winding overhang (25) of the electric motor (3).

10. The actuator device (1) of claim 1, further comprising an axial spring (17) in a spring holder (18) of a spring casing (16), the spring casing (16) being rotationally fixed with respect to the actuator housing (2), the threaded spindle (10) being operatively connected to the axial spring (17).

11. The actuator device (1) of claim 10, wherein the spring holder (18) is rotationally fixed to the threaded spindle (10), wherein the spring holder (18) is secured against rotation relative to the spring casing (16).

12. The actuator device (1) of claim 1, wherein an interior space (19) of the actuator housing (2) is fluid-sealed with respect to an external atmosphere.

13. The actuator device (1) of claim 1, further comprising a circuit board (20) for at least indirect interconnection of the electric motor (3).

14. The actuator device (1) of claim 13, further comprising at least one sensor (21) for detecting a rotational position of the electric motor (3).

15. The actuator device (1) of claim 13, further comprising a floating bearing (12), the rotor carrier (6) being at least indirectly supported relative to the actuator housing (2) via the floating bearing (12),
wherein the circuit board (20) defines a central opening (36), a bearing journal (26) being guided through the central opening (36), the floating bearing (26) being accommodated on the bearing journal 26 in order to support the rotor carrier (6) with respect to the actuator housing (2).

16. The actuator device (1) of claim 1, wherein the rotor is radially within the stator.

17. An actuator device (1) for generating a longitudinal positioning movement to engage a shift element, the actuator device (1) comprising:
an actuator housing (2);
an electric motor (3) within the actuator housing (2), the electric motor (3) having a stator (4) and a rotor (5), the stator (4) being at least indirectly stationarily fixed at the actuator housing (2), the rotor (5) being rotatable relative to the stator (4), the rotor (5) being rotationally fixed to a rotor carrier (6) to prevent rotation of the rotor (5) relative to the rotor carrier (6), the rotor carrier (6) being at least indirectly supported relative to the actuator housing (2) via a fixed bearing (7);
a circuit board (20) for at least indirect interconnection of the electric motor (3), the circuit board (20) defining a central opening (36);
a bearing journal (26) guided through the central opening (36);

a floating bearing (12) accommodated on the bearing journal 26 to at least indirectly support the rotor carrier (6) relative to the actuator housing (2); and a threaded drive (8) having a threaded nut (9) and a threaded spindle (10), the threaded nut (9) being rotationally driveable and axially fixed, the threaded spindle (10) being axially displaceable along the threaded nut (9) and being secured against rotation, the threaded nut (9) being rotationally fixed to the rotor carrier (6) and to a bearing inner race (7*a*) of the fixed bearing (7), the threaded nut (9) being at least partially radially within the fixed bearing (7), the fixed bearing (7) supporting axial loads from the threaded drive (8) on the actuator housing (2).

\* \* \* \* \*